United States Patent [19]

Barcelon et al.

[11] Patent Number: 4,853,247

[45] Date of Patent: Aug. 1, 1989

[54] TASTE AND ODOR MASKED EDIBLE OIL COMPOSITIONS

[75] Inventors: Shirley Ann Barcelon; Alfred Oppenheimer, both of Randolph; Mamoun M. Hussein, Mountain Lakes, all of N.J.

[73] Assignee: Warner-Lambert Co., Morris Plains, N.J.

[21] Appl. No.: 62,930

[22] Filed: Jun. 16, 1987

[51] Int. Cl.$^4$ .............................................. A23D 5/00
[52] U.S. Cl. ..................................... 426/613; 426/534
[58] Field of Search ....................... 426/601, 613, 534

[56] References Cited

U.S. PATENT DOCUMENTS 4,044,168  8/1977  Steenhoek et al. ................. 426/613
4,424,379  1/1984  Sprecker et al. ............... 426/538 X

*Primary Examiner*—Donald E. Czaja
*Assistant Examiner*—Celine T. Callahan
*Attorney, Agent, or Firm*—Charles A. Gaglia, Jr.

[57] ABSTRACT

Pleasant tasting, pleasant smelling edible oil compositions and a process for making same has been developed. The product comprises an unpleasant edible oil and an oil soluble sensory masking agent capable of producing a masking sensation for the unpleasant edible oil. The sensory masking agent is capable of producing a taste masking and/or odor masking sensation for the unpleasant edible oil.

16 Claims, No Drawings

TASTE AND ODOR MASKED EDIBLE OIL COMPOSITIONS

BACKGROUND OF THE INVENTION

1. Field of the Invention

This invention relates to a method of masking the unpleasant taste and/or odor of certain animal and vegetable oils to form pleasant tasting and pleasant smelling oil compositions. The pleasant tasting and pleasant smelling oil compositions are useful as solvents or starting materials for the formation of number of products. Oil based products are useful in the food, pharmaceutical and cosmetic industries.

2. Description of the Prior Art

Well known techniques utilized to improve the taste and odor of unpleasant oils include purification of the oil through: distillation, extraction and precipitation. These techniques are intended to remove off tasting and off smelling components producing a bland or neutral tasting and neutral smelling oil.

The distillation, extraction and precipitation techniques are expensive and often remove more than the undesirable oil components. In addition, purified oils on standing form new unpleasant tasting and smelling degradation products, usually oxidative, of the fatty acids present in the oil.

U.S. Pat. No. 85,668 to Hyatt discloses masking the taste of cod liver oil and other oils for medicinal use. Hyatt reduces the oil to an emulsive condition then unites it with carbonic acid gas in the form of a carbonated liquid. This insures the simultaneous entrance of both the gas and oil into the stomach.

The emulsion is formed by mixing 2 parts syrup of gum, or syrup of gelatin with one part oil, beating the mass well together, and adding some flavoring material. When combined with the carbonated liquid, a "bottled soda-water" like product is formed.

The process of Hyatt totally changes the character of the oil in producing gas-aqueous-oil gum or gelatin mixtures. These mixtures are not readily formulated into food, pharmaceutical and cosmetic products.

U.S. Pat. No. 4,382,924 to Berling et, al., discloses pleasant-tasting, non-greasy, edible oil or oil-like materials, a high potency, lipid soluble sweetener, such as saccharin, and a lipid soluble flavorant. These compositions are particularly useful as an oral dosage form for vitamins or pharmaceutical materials; in such embodiments the edible oil-like material may consist, in whole or in part, of an oily pharmaceutical agent, such as polyol fatty acid esters having at least four fatty acid ester groups, each fatty acid having from about 8 to about 22 carbon atoms.

It is desirable to produce pleasant tasting, pleasant smelling oil compositions from unpleasant oils having an unpleasant taste and/or unpleasant odor by a low cost process that leaves the oil essentially unchanged.

SUMMARY OF THE INVENTION

The present invention relates to pleasant edible oil compositions having pleasant taste and/or pleasant odor which comprises:
- an unpleasant edible oil having at least one of the following properties: unpleasant taste, and unpleasant odor;
- an oil soluble sensory masking agent capable of producing a masking sensation for the properties of the unpleasant edible oil, wherein the sensory masking agent is present in an amount sufficient to sensory mask the properties of the unpleasant edible oil resulting in a pleasant edible oil.

The pleasant edible oil compositions of the present invention may contain up to about 99.9% by weight oil. The inventive compositions may be used as edible oils in food compositions, oral and topical pharmaceutical dosage forms.

DETAILED DESCRIPTION OF THE INVENTION

In particular, it has been found that a sensory masked unpleasant oil composition is produced when an oil soluble sensory masking agent is admixed with an unpleasant edible oil. The sensory masking agent acts to cover up or make indistinguishable the unpleasant taste, unpleasant odor or both of the oil.

The term "sensory" shall be defined as relating to at least one of the senses of taste and smell.

The term "unpleasant edible oil" shall be defined as an edible oil having an unpleasant taste, unpleasant odor or both unpleasant taste and unpleasant odor.

The term "sensory masked unpleasant edible oil" shall be defined as an unpleasant edible oil in which the unpleasant taste and/or unpleasant odor have been masked by a suitable sensory masking agent such that the resulting oil composition has a pleasant taste and pleasant odor.

Taste is a sensation obtained from a substance in the mouth. The sensation is typically produced by the stimulation of the sense of taste combined with the senses of touch and smell. Taste is a special sense that perceives and distinguishes the sweet, sour, bitter or salty quality of a dissolved substance and is mediated by the taste buds on the tongue.

Odor is a sensation of something that stimulates the olfactory nerves. Odor molecules are inhaled and float back in the nasal cavity. The odor molecules are then absorbed by the mucosa and microscopic hairs, called cilia, that contain olfactory receptor cells. These receptor cells fire off impulses to the brain's olfactory bulb where the odor is registered.

In order to sensory mask taste and odor, two conditions must exist. First, the sensory masking agent must be available at the sensory site. Second, the sensation produced by the masking agent must be greater or more intense than the analogous sensation produced by the unpleasant agent. The intensity of the sensation produced by the masking agent is dependent on the concentration of the agent at the sensing site and the natural sensitivity of the sensing organ to a particular agent.

While the invention is not to be limited to theoretical considerations, it is believed that the taste masking agents must have two properties. First, they are soluble in oil. Second, they can be extracted from the oil by the essentially aqueous environment of the oral cavity.

Two similar properties are required for odor masking. First, the agent is soluble in oil. Second, the agent must volatilize from the oil so that it can enter the nasal cavity.

Solubility in oil allows for uniform distribution of the sensory masking agent throughout the composition. It is critical, however, that the masking agent leave the oil and reach the sensory organs in a sufficient concentration to mask.

The sensory masking agent is present in an amount sufficient to sensory mask the unpleasant edible oil resulting in a pleasant edible oil. In general, the sensory masking agent is present in an amount of from about 0.1% to about 10%, preferably from about 0.2% to about 8%, and most preferably from about 0.35% to about 6% by weight of the total composition.

Sensory masking agents useful in the present invention are varied and may mask odor, taste or odor and taste.

Illustrative non limiting examples of sensory masking agents useful in the present invention include taste and odor masking agents such as anethole, dihydroanethole, eugenol, wintergreen and the like; taste masking agents such as vanillin, ethylvanillin, ethylmaltol and the like; and odor masking agents such as natural and artificial fruit, citrus and mint including, lime, lemon, orange, pineapple, grapefruit, cinnamon, clove, bay, allspice, anise, spearmint, peppermint, benzaldehyde, cherry and the like and mixtures thereof. Any of the masking agents may be used individually or in mixtures.

It is believed that odor masking agents useful in the present invention are volatile compositions having at least one component with a boiling point less than about 250° C. and greater than about 150° C. Odor masking agents having boiling points greater than about 250° C. do not volatilize from the edible oil in sufficient quantity to mask odor. Odor masking agents having boiling points less than about 150° C. would volatilize too rapidly to provide a sustained odor masking. In addition, sensory masking agents such as the flavor oils do not have sufficient water soluble to mask the taste of oil compositions of the present invention.

In preferred embodiments of the present invention, combinations of taste masking and odor masking agents are utilized to produce very pleasant taste and odor masked compositions. Combinations of a taste masking agent such as vanillin and an odor masking agent such as a fruit, citrus or mint oil produce especially pleasant tasting and pleasant smelling compositions.

The compositions of the present invention contain in major part, an unpleasant edible oil. The compositions contain from about 90% to about 99.9%, preferably about 92% to about 99.8%, an most preferably about 94% to about 99.65% by weight unpleasant edible oil.

The oils useful in the present invention are varied and may be of animal, vegetable or mineral origin. Throughout the specification and claims, the term "oil" shall be defined as any oil of animal, vegetable or mineral origin in liquid form at the time of addition of the sensory masking agent. "Edible oils" are oils fit for human consumption.

The present invention is preferably formulated as a liquid, it may also be formulated as a semisolid or a solid for example, a margarine like spread. In the preferred embodiment, the oil should be a liquid at room temperature. Any unpleasant edible oil may be included in the compositions of the present invention.

Illustrative, nonlimiting examples of oils useful in the present invention include animal oils such as the marine oils: fish oil, whale oil, fish liver oil, seal oil, oils containing at least one omega-3 fatty acid and the like; vegetable oils such as castor oil, linseed oil, and the like. Any of the oils may be used individually or in mixtures.

The pleasant tasting and pleasant smelling oil compositions may be stored for future use or formulated with conventional additives to prepare medicatd and non medicated compositions which offer a variety of tastes, smells and textures from a liquid to a lotion, cream, ointment, grease or other forms to suit particular applications. While the compositions of the present invention are ideally suited for nonaqueous applications, water and oil emulsions can be formed. The novel compositions of this invention may be utilized in pharmaceuticals, cosmetics, personal care products, foods, lubricants and solvents.

Compositions of the present invention are prepared by admixing the unpleasant edible oil with the sensory masking agent until a uniform solution is obtained.

The mixing time and temperatures are not critical other than the mixing temperature be below the lesser of the degradation or volatilization temperature of the oil and the sensory masking agent.

The present invention is further illustrated by the following examples. All parts and percentages in the examples and throughout the specification and claims are by total weight of the composition unless otherwise indicated.

EXAMPLE 1

(Inventive Run 1)

This example demonstrates a method for preparing a palatable suspension of castor oil. The ingredients are mixed in the order indicated.

| No. | Ingredient | Percent (w/w) |
|---|---|---|
| 1. | Castor Oil | 70.00 |
| 2. | Magnesium trisilicate | 19.47 |
| 3. | Maltodextrin | 5.00 |
| 4. | dl-alpha tocopherol | 0.03 |
| 5. | Flavor (w/w) | 4.50 |
| | Lemon Oil 5x    80% | |
| | Vanillin              5% | |
| | Alcohol             15% | |
| 6. | Aspartame (sweetener) | 1.00 |

Procedure

The oil and magnesium trisilicate are mixed until a homogeneous mixture of increased viscosity is obtained. The maltodextrin, dl-alpha tocopherol, flavor and aspartame are added with continued mixing until a homogeneous suspension is formed.

The final suspension has a palatable mouth feel, a pleasant taste and a pleasant odor. The ingredients of the suspension will settle on standing, but rapidly resuspend with gentle mixing.

EXAMPLE 2

(Inventive Run 2)

This example demonstrates a method for preparing a palatable suspension of fish oil. The ingredients are mixed in the order indicated until a homogeneous suspension is formed.

| No. | Ingredient | Percent (w/w) |
|---|---|---|
| 1. | Fish oil | 70.0 |
| 2. | Magnesium trisilicate | 19.97 |
| 3. | Maltodextrin | 5.00 |
| 4. | dl-alpha Tocopherol | 0.03 |
| 5. | Flavor (w/w) | 4.00 |
| | Lemon Oil 5x    80% | |
| | Vanillin              5% | |
| | Alcohol             15% | |
| 6. | Aspartame (sweetener) | 1.00 |

Procedure

The oil and magnesium trisilicate are mixed until a homogeneous mixture of increased viscosity is obtained. The maltodextrin, dl-alpha tocopherol, flavor and aspartame are added with continued mixing until a homogeneous suspension is formed.

The final suspension has a palatable mouth feel, a pleasant taste and a pleasant odor. The ingredients of the suspension will settle on standing, but rapidly resuspend with gentle mixing.

EXAMPLE 3

(Inventive Run 3)

This example demonstrates a method for preparing a palatable suspension of cod liver oil. The ingredients are mixed in the order indicated until a homogeneous suspension is formed.

| No. | Ingredient | Percent (w/w) |
| --- | --- | --- |
| 1. | Cod Liver Oil | 70.00 |
| 2. | Magnesium trisilicate | 19.47 |
| 3. | Maltodextrin | 5.00 |
| 4. | dl-alpha tocopherol | 0.03 |
| 5. | Flavor (w/w) | 4.50 |
|    | Lemon Oil 5x  80% | |
|    | Vanillin  5% | |
|    | Alcohol  15% | |
| 6. | Aspartame (sweetener) | 1.00 |

Procedure

The oil and magnesium trisilicate are mixed until a homogeneous mixture of increased viscosity is obtained. The maltodextrin, dl-alpha tocopherol, flavor and aspartame are added with continued mixing until a homogeneous suspension is formed.

The final suspension has a palatable mouth feel, a pleasant tastes and a pleasant odor. The ingredients of the suspension will settle on standing, but rapidly resuspend with gentle mixing.

EXAMPLE 4

This example demonstrates the masking effect of masking agents on fish oil having both unpleasant taste and unpleasant odor.

The compositions of Table 4 were prepared by admixing various oil soluble masking agents with fish oil. The final compositions contained 5% masking agent.

| Masking Agent | Boiling Point °C. | Masking Effect Odor | Masking Effect Taste |
| --- | --- | --- | --- |
| Benzaldehyde | 179 | Y | N |
| Orange Oil | 176 (1) | Y | N |
| Peppermint Oil | 216 (2) | Y | N |
| Spearmint Oil | 230 (3) | Y | N |
| Lemon Oil | 228 (4) | Y | N |
| Ethyl Maltol | — | N | Y |
| Ethylvanillin | 285 | N | Y |
| Vanillin | 285 | N | Y |
| Anethole | 236 | Y | Y |
| Dihydroanethole | 225 | Y | Y |
| Eugenol | 253 | Y | Y |
| Methyl Salicylate | 220 | Y | Y |

Y = Yes has a masking effect
N = No masking effect

The masking agents tested above were found to mask the taste, odor or both of fish oil.

Major flavor characterizing component of oil listed above:
(1) Boiling point of d-limonene
(2) Boiling point of l-menthol
(3) Boiling point of l-carvone
(4) Boiling point of citral

EXAMPLE 5

This example demonstrates the masking of odor and taste of fish oil with varying concentrations of vanillin added to a fish oil suspension. The suspension ingredients are mixed in the order indicated until a homogeneous suspension is formed.

| No. | Ingredient | Amount grams |
| --- | --- | --- |
| 1. | Fish oil | 70.0 |
| 2. | Magnesium trisilicate | 19.67 |
| 3. | Maltodextrin | 5.00 |
| 4. | dl-alpha Tocopherol | 0.03 |
| 5. | Aspartame (sweetener) | 1.00 |

To portions of the suspension, quantities of vanillin were added to produce suspensions containing the percentages of vanillin listed below. The taste and odor of each suspension was determined.

| Vanillin % (w/w) | Sensory Masking Odor | Sensory Masking Taste |
| --- | --- | --- |
| 5% | Fishy | No fish taste - bitterness and chemical harshness |
| 1% | Fishy | No fish taste - a pleasant taste |
| 0.5% | Fishy | Slight hint of fish taste |
| 0.27% | Fishy | Hint of fish taste |
| 0.05% | Fishy | Fish taste |

Vanillin concentrations from 0.5% mask fish oil taste. Fish odor is not masked by vanillin.

EXAMPLE 6

This example demonstrates the masking of odor and taste of fish oil with varying concentrations of ethyl vanillin added to a fish oil suspension. The suspension ingredients are mixed in the order indicated until a homogeneous suspension is formed.

| No. | Ingredient | Amount grams |
| --- | --- | --- |
| 1. | Fish oil | 70.0 |
| 2. | Magnesium trisilicate | 19.67 |
| 3. | Maltodextrin | 5.00 |
| 4. | dl-alpha Tocopherol | 0.03 |
| 5. | Aspartame (sweetener) | 1.00 |

To portions of the suspension, quantities of ethyl vanillin were added to produce suspensions containing the percentages of ethyl vanillin listed below. The taste and odor of each suspension was determined.

| Ethyl vanillin | Odor | Taste |
| --- | --- | --- |
| 2% | Fishy | No fish taste |
| 0.2% | Fishy | No fish taste |
| 0.025% | Fishy | Slight hint of fish taste |

Ethyl vanillin concentrations from 0.025% mask fish oil taste. Fish odor is not masked by ethyl vanillin.

EXAMPLE 7

This example demonstrates the masking of odor and taste of fish oil with combinations of taste and odor masking agents. The taste and odor masking agents were added to a fish oil suspension. The suspension ingredients are mixed in the order indicated until a homogeneous suspension is formed.

| No. | Ingredient | Amount grams |
|---|---|---|
| 1. | Fish oil | 70.0 |
| 2. | Magnesium trisilicate | 19.67 |
| 3. | Maltodextrin | 5.00 |
| 4. | dl-alpha Tocopherol | 0.03 |
| 5. | Aspartame (sweetener) | 1.00 |

To portions of the suspension, quantities of flavor masking agent and taste masking agent were added to produce suspensions containing the percentages listed below. The taste and odor of each suspension was determined.

| Masking Agent | Composition Percent Masking Agent (w/w) | | | | | | | | |
|---|---|---|---|---|---|---|---|---|---|
| | 1 | 2 | 3 | 4 | 5 | 6 | 7 | 8 | 9 |
| Orange Oil | | | | | 2 | | | | |
| Peppermint Oil | 0.5 | 0.5 | 1 | 1 | | | | | |
| Spearmint Oil | | | | | | | | 1 | 1 |
| Vanillin | | 0.6 | 2 | | 2 | 1 | 0.5 | 2 | |
| Ethyl-maltol | | | | 2 | | | | | 2 |
| Masking |  |  |  |  |  |  |  |  |  |
| Taste | No | Yes | Yes | Yes | Yes | Yes | Yes | Yes | Yes |
| Odor | Yes | Yes | Yes | Yes | Yes | Yes | Yes | Yes | Yes |

Composition 1 had odor masked but no taste mask. Compositions 2 to 9 had both taste and odor masked producing pleasant smelling and pleasant tasting compositions.

This invention being thus described, it will be obvious that the same may be varied in many ways. Such variations are not to be regarded as a departure from the spirit and scope of the invention and all such modifications are intended to be included within the scope of the following claims.

We claim:

1. A sensory masked edible oil composition which comprises:
   An unpleasant edible oil, and an oil soluble sensory masking agent capable of producing a masking sensation for the unpleasant edible oil, wherein the sensory masking agent is present in an amount sufficient to sensory mask the unpleasant edible oil and the taste masking agent must be extractable into the aqueous medium of the oral cavity and the odor masking agent must have a boiling point between about 150° C. and about 250° C. resulting in a pleasant edible oil.

2. The composition of claim 1, wherein the sensory masking agent is capable of producing a taste masking sensation for the unpleasant edible oil.

3. The composition of claim 1, wherein the sensory masking agent is capable of producing an odor masking sensation for the unpleasant edible oil.

4. The composition of claim 1, wherein the sensory masking agent is capable of producing a taste masking sensation and an odor masking sensation for the unpleasant edible oil.

5. The compostion of claim 1 wherein the sensory masking agent is present in an amount of about 0.1% to about 10% by weight of the total composition.

6. The composition of claim 2 wherein the sensory masking agent is at least one taste masking agent.

7. The composition of claim 3 wherein the sensory masking agent is at least one odor masking agent.

8. The composition of claim 4 wherein the sensory masking agent is at least one taste masking agent and at least one odor masking agent.

9. The composition of claim 5 wherein the taste masking agent is selected from the group consisting of: anethole, dihydroanethole, eugenol, vanillin, ethylvanillin, ethyl maltol, and mixtures thereof.

10. The composition of claim 7 wherein the odor masking agent is selected from the group consisting of: natural and artificial; lime, lemon, orange, pineapple, grapefruit, cinnamon, clove, bay, allspice, anise, wintergreen, spearmint, peppermint, anethole, dihydroanethole, eugenol, benzaldehyde, and mixtures therefore.

11. The composition of claim 8 wherein the taste masking agent is selected from the group consisting of: anethole, dihydroanethole, eugenol and mixtures thereof.

12. The composition of claim 8 wherein the taste masking agent is selected from the group consisting of: anethole, dihydroanethole, eugenol, vanillin, ethylvanillin, ethyl maltol and mixtures thereof, and the fragrance is selected from the group consisting of natural and artificial; lime, lemon, orange, pineapple, grapefruit, cinnamon, clove, bay, allspice, anise, wintergreen, spearmint, peppermint, benzaldehyde, cherry and mixtures thereof.

13. The composition of claim 1, wherein the unpleasant edible oil is selected from the group consisting of animal oil, vegetable oil, mineral oil and mixtures thereof.

14. The composition of claim 1 wherein the unpleasant edible oil is a marine oil selected from the group consisting of fish oil, fish liver oil, seal oil, whale oil; oil containing at least one omega-3 fatty acid and mixtures thereof.

15. The composition of claim 1, wherein the unpleasant edible oil is a marine oil containing at least one omega-3 fatty acid.

16. The composition of claim 1 wherein the unpleasant edible oil is a vegetable oil selected from the group consisting of castor, linseed and mixtures thereof.

* * * * *